US007519998B2

(12) United States Patent
Cai et al.

(10) Patent No.: US 7,519,998 B2
(45) Date of Patent: Apr. 14, 2009

(54) DETECTION OF MALICIOUS COMPUTER EXECUTABLES

(75) Inventors: Dongming M. Cai, Los Alamos, NM (US); Maya Gokhale, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 722 days.

(21) Appl. No.: 10/900,697

(22) Filed: Jul. 28, 2004

(65) Prior Publication Data

US 2006/0026675 A1 Feb. 2, 2006

(51) Int. Cl.
G06F 11/00 (2006.01)
G06F 11/30 (2006.01)
G06F 7/58 (2006.01)
G06F 12/14 (2006.01)
G06F 15/16 (2006.01)
G06F 13/38 (2006.01)

(52) U.S. Cl. .............................. 726/24; 726/3; 726/23; 713/187; 713/188

(58) Field of Classification Search .................. 726/24, 726/23; 713/187, 181
See application file for complete search history.

(56) References Cited

U.S. PATENT DOCUMENTS

2003/0065926 A1* 4/2003 Schultz et al. .............. 713/188
2005/0028002 A1* 2/2005 Christodorescu et al. .... 713/200
2006/0004748 A1* 1/2006 Ramarathnam et al. ........ 707/6

FOREIGN PATENT DOCUMENTS

WO WO 2004021197 A1 * 3/2004

OTHER PUBLICATIONS

Zhenkai Liang, R. Sekar, "Fast and automated generation of attack signatures: a basis for building self-protecting servers", Nov. 2005, ACM CCS '05: Proceedings of the 12th ACM Conference on Computer and Communications Security, p. 213-222.*

* cited by examiner

*Primary Examiner*—Matthew B Smithers
*Assistant Examiner*—Courtney D Fields
(74) *Attorney, Agent, or Firm*—Milton D. Wyrick; Juliet A. Jones

(57) ABSTRACT

A method of detecting malicious binary executable files is accomplished by inputting a binary executable file; converting the binary executable file to byte hexadecimal text strings; calculating the frequency of each byte pattern in the byte hexadecimal text strings; selecting characteristic byte pattern frequencies as discriminating features; classifying the discriminating features as malicious or benign; labeling the binary executable file as malicious or benign; and outputting the labeled malicious or benign binary executable file.

6 Claims, 1 Drawing Sheet

DETECTION OF MALICIOUS COMPUTER EXECUTABLES

The present invention generally relates to computer protection, and, more specifically to anti-virus protection for computers that has a high detection rate and a very low false-positive alarm rate. This invention was made with Government support under Contract No. W-7405-ENG-36 awarded by the U.S. Department of Energy. The Government has certain rights in the invention.

BACKGROUND OF THE INVENTION

As the use of computers and networks continues to escalate, and the exponential growth of the Internet, it appears that malicious virus attacks on connected computers also is growing at an alarming rate. A serious virus attack can easily and quickly destroy or corrupt all the files on an infected computer.

The Internet has created unprecedented opportunities in the access to, and the sharing of information. Information exchange runs over a large range, and is carried out continuously and ubiquitously. The primary method of sharing information on the Internet is through email. While originally intended as convenient tool for text messages, email has evolved into backbone of the Internet. It has become the primary medium not only for communicating ideas, opinions, advertising and scheduling, but also for unauthorized access and malicious attacks. For example, a malicious executable program attached to what appears to be a benign email can be sent to millions of recipients. With only one or two mouse clicks, the program can severely damage computer systems and associated networks.

These unwanted programs include improperly obtaining access privileges (known as Trapdoor), obtaining private or sensitive information (known as Covert Channel), exhausting system resources (known as Worm), and infecting resident programs (known as Virus). Some malicious programs contain all of the preceding actions.

There are several ways to determine whether a program can perform malicious functions. In one case, a program being screened can be compared with a known "clean" copy of the program. Known malicious codes can be detected by virus scanners or compared against a set of verification rules serving as malicious code filters. In another method, dynamic analysis combines the concept of testing and debugging to detect malicious activities by running a program in a cleanroom environment.

However, some malicious programs may elude detection because they do not match any known signatures. This may be due to its signature deviating from known signatures, or it may contain new signatures that have not been previously encountered. As hackers continuously create and modify malicious programs, it becomes necessary to not only to detect malicious programs that exactly match known signatures, but also to detect new signatures having similar features to the known signatures.

In a previous attempt to address this problem, Kephart and his colleagues at the High Integrity Computing Laboratory at IBM®, used statistical methods to automatically extract computer virus signatures. Their process was to identify the presence of a virus in an executable file, a boot record, or memory using short identifiers or signatures, which consist of sequences of bytes in the machine code. A good signature is one that is found in every object infected by the virus, but is unlikely to be found if the virus is not present. Later, researchers from that same group successfully developed a neural network based anti-virus scanner to detect the boot sector virus. However, due to system limitations at the time, it was difficult to extend the neural network classifier to detect other types of viruses other than the boot sector virus, a relatively small, but critical, percentage of all computer viruses.

Others have used data mining techniques to analyze a large set of malicious executables instead of only boot-sector, or Win32 binaries. System resource information, embedded text strings and byte sequences as features extracted from executables were utilized. Three learning algorithms were used to classify the data: (1) an inductive rule-based learner that generates Boolean rules based on feature attributes; (2) a Naïve Bayes classifier that estimates posterior probabilities that a testing file is in a class given a set of features; and (3) a multi-classifier system that combines the outputs from several Naïve Bayes classifiers to generate an overall prediction. The results showed two classifiers, the Naïves Bayes classifier (using text string as features) and multi-Naïves Bayes classifiers (using only byte sequences), outperformed all the other methods in terms of overall performance measured by detection rate and false positive rate.

In a recent study conducted by the applicants herein, the performance of six different feature classification methods against Naïves Bayes, entropy, and product classifiers in distinguishing benign and malicious binaries was compared. Afterwards, an investigation was conducted as to whether extending the features to multiple-byte sequences could improve the classification accuracy. Finally, Support Vector Machine (SVM) classifiers, with different kernel functions, were applied and their performance was compared. The rationale for choosing byte sequences as candidate feature is that those byte patterns are the most accessible and reliable information that represents the machine code in an executable. However, using embedded text strings as features, such as head information, program names, authors' names, or comments is not robust since they can be easily changed. Some malicious executables intentionally camouflage these signatures by randomly generating these fields to deceive virus scanners.

The majority of existing virus detection technologies can be categorized into the following three types based on their detection methods. The first is Signature Scanning. The approach used in these programs allows them to examine executable files on a computer for known virus code fragment within their contents. The main disadvantage to this approach is that the scanner cannot detect a new virus if the database does not contain the virus definition. The second is Heuristic Analysis. This method checks objects by analyzing the instruction sequences in the objects' contents. If an instruction sequence matches an instruction sequence of a known virus, and alarm is raised. Presently, this approach produces a large number of false alarms, and, therefore, is not practically applicable for operational environments. Virus writers responded to this method by implementing various techniques, such as encryption and polymorphism, allowing viruses to deceive these heuristic analyzers. The third is Behavior Modeling, a new research direction followed by the applicants herein. This method seeks to establish a general profile in separating benign and malicious codes. In comparison with the aforementioned two methods, this method has the capability not only to detect known viruses, but also their variants, and unknown viruses. Such programs can achieve high protection against attacks from new viruses. However, the unresolved challenge is to lower their false positive rate to an acceptable level.

The present invention solves these problems of the prior art by providing reliable malicious code detection using these byte sequence frequencies. It outperforms existing scanning technologies in achieving high accuracy in detecting known viruses and their unknown variants and in maintaining a very low false positive rate.

SUMMARY OF THE INVENTION

In order to achieve the objects and purposes of the present invention, and In accordance with its objectives, a method of detecting malicious binary executable files comprises the steps of: inputting a binary executable file; converting the binary executable file to byte hexadecimal text strings; calculating the frequency of each byte pattern in the byte hexadecimal text strings; selecting characteristic byte pattern frequencies as discriminating features; classifying the discriminating features as malicious or benign; labeling the binary executable file as malicious or benign; and outputting the labeled malicious or benign binary executable file.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION

The present invention provides reliable malicious code detection using these byte sequence frequencies. It achieves high accuracy in the detection of known viruses and their unknown variants, and in maintaining a very low false positive rate. The invention may most easily be understood through reference to the figures and the following description.

Figure 1:
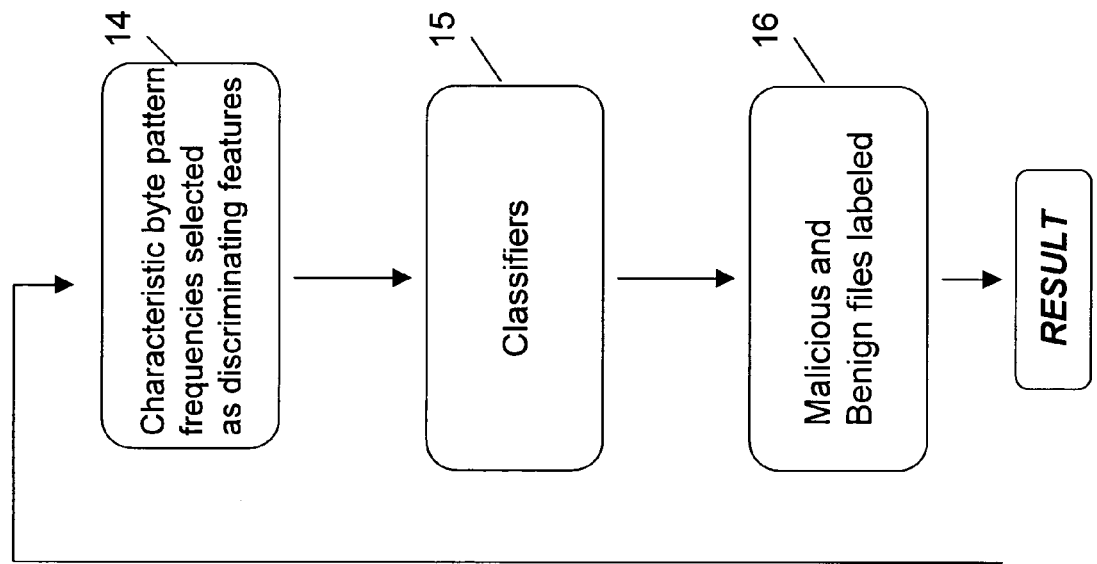
FIG. 1 is a block diagram illustrating the steps involved in accomplishing the functions of the present invention.
Figure 1:
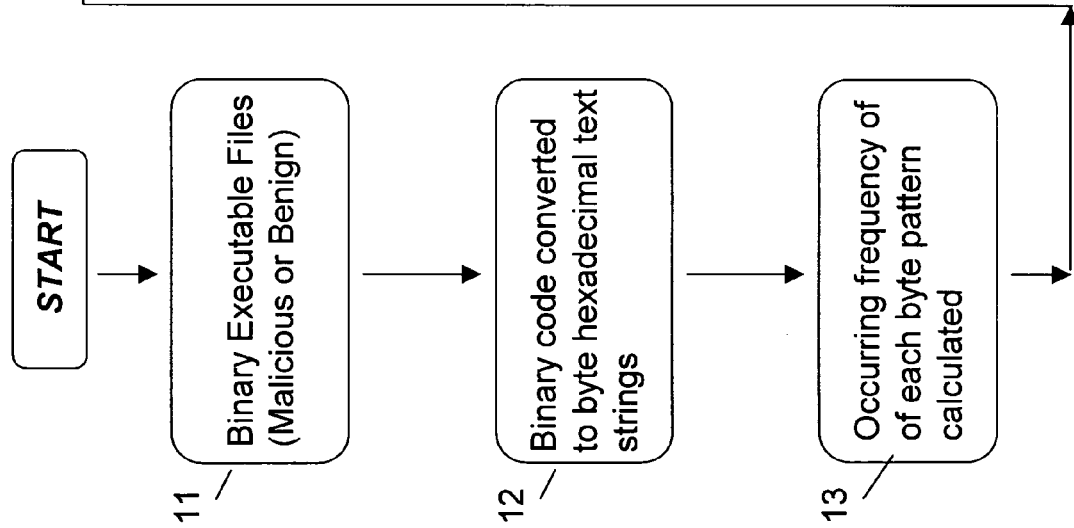

Referring first to FIG. 1, where a block diagram of the functioning of the present invention is illustrated. As seen, initially, binary executable file 11 is input. Binary executable file 11 could be, for example, an attachment to an email message, or a download from a website. The binary executable file 11 is then converted to byte hexadecimal text strings 12. A portion of exemplary code could appear as follows:

| 07eb | 0a56 | 5903 | 1a00 | 0e00 | 00e8 | fa00 | ec8b |
| 3258 | 89c0 | 0246 | 4681 | 2800 | b900 | 05ce | 2cb0 |
| 4688 | 8bff | 007e | 4e88 | 8afe | ff4e | 0d00 | 00eb |
| 8a47 | fe4e | c4e2 | 88cf | a103 | daf5 | 0727 | 6294 |
| 74ac | d8eb | e4f8 | 5424 | ebfa | c3d8 | 9c60 | ac62 |

The detection practiced by the present invention is based solely on string pattern recognition. This practice frees a computer user from the risk of running a malicious executable and potentially causing damage to the computer system.

Byte hexadecimal text strings 12 are then examined by occurring frequency of each byte pattern calculated 13. Here, the occurrence of each single byte pattern, such as "00" or "ff" is counted. As an example, the number of occurrences for "00" can be assumed to be 200, and the file can be assumed to have a total of 10,000 single byte patterns. The occurring frequency for "00" in this example file will be 200/10,000=0.02. Following this procedure, all occurring frequencies for other single byte patterns are calculated. These calculations form a vector such as follows:

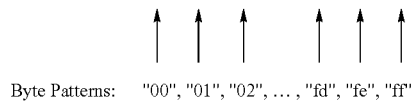

Frequency Vector: (0.02, 0.01, 0.05, ... , 0.01, 0.04, 0.05)

Byte Patterns: "00", "01", "02", ... , "fd", "fe", "ff"

Each file, whether malicious or benign, will have on unique frequency vector with which it is associated. However, this vector may not be the feature vector that is described below.

The next step in the process is characteristic byte pattern frequencies selected as discriminating features 14 where a "maximal difference" is calculated. In this step, the difference between the average frequency of the pattern in the benign files and the average frequency in the malicious files is computed. This difference is computed for each feature and the differences are sorted in ascending order. The patterns at the top of the list occur more often in malicious executables than in benign executables, while patterns at the bottom of the list occur more often in benign files than in malicious files. In order to choose features, N/2 of the top features of the list and N/2 of the bottom features are selected. N is the total number of features that it is desired by the user to examine. In testing of the invention, it has been determined that N=100 provides the best overall performance.

These N features are then passed to classifiers 15, which are trained to find the maximum separation between malicious and benign files. Among classifiers in general, many have different mathematical structures and therefore yield different performances. Testing has indicated that, for the present invention, SVMs with radial basis function as the kernel provides the best prediction accuracy.

The output of classifiers 15 is provided to malicious and benign files labeled 16. Here, the malicious and benign files are appropriately labeled so that they are directed to the correct category for an incoming binary executable file.

The use of frequency-derived statistical measures of byte sequences to detect malicious executables differs greatly from a program analysis approach. Code analysis examines meaningful information on operation codes, address ranges, function calls, and data flow, either statically or by actually running and monitoring the code to infer potential malicious behavior. "Clean room" execution may lead to identification of malicious codes not detected static analysis. Single bytes in binary executable do not retain any interpretable meanings of function, data flow, or even instruction. However, by examining correlations of theses byte patterns between malicious and benign programs, the present invention uses classifiers that make a highly accurate separation between malicious and benign programs.

In the present invention, the byte value frequencies are extracted from each test file. Those with skill in this art will recognize that the method of normalizing byte pattern frequency across multiple files in the testing data set affects the performance results. For a given byte sequence pattern, it is possible to calculate that pattern's frequency in each file, and then to average the frequencies of the same patterns across all the files in the same class as the given pattern. This approach skews more weight toward rare patterns, especially in the case of relatively small files. Alternatively, it is possible to sum occurrences of the same patterns across all the files, and then calculate an average frequency of the class. This type of calculation attaches more weight to those patterns that occur most frequently, particularly in very large files. For the present invention, it has been determined that the first approach, that of normalizing within a file and then within the class so that all files are given equal weight regardless of their sizes, yields better performance for the purposes of this invention.

Careful comparison of Naïve Bayes, entropy and product based classifiers determined that the product based classifier performed better than the other two for the purposes of the present invention. It also requires the least computation overhead of the group. Finally, as the product-based classifier uses only byte frequencies of an executable file as features, and does simple multiplication and logic comparisons, it is amenable to acceleration using programmable hardware.

In testing, in comparison to other types of classifiers, the SVM classifier clearly renders the best overall performance in terms of detection rate and false positive rate. It was determined that the SVM classifier, using a radial basis function and the backward selection method, can achieve a 96.3% detection rate, at only a 0.93% false positive rate.

The performance of the SVM classifier is less dependent on the number of features used. For example, when the number of features varied from 20 to 100, the false positive rate varied only within the range of 1-5%, for a detection rate of 95%. When all possible 256 patterns were used, the performance of the SVM classifier deteriorated only 1-2%. This confirms the reputation of SVM classifiers having the ability to handle large feature spaces without data overfitting. The high prediction accuracy indicates that the features representing malicious and benign programs may well be linearly separable when mapped into a high dimensional feature space using the correct kernel functions, e.g. a radial basis function. With nearly four thousand training files, and up to several hundred-feature dimensions, the training time, excluding pre-processing time, was slightly over one minute.

Similarly, feature selection methods were compared, with forward selection proving to be most reliable in selecting the best set of features for a given classifier. In this work, it has been determined that, between classifiers and feature selection methods, the overall performance of the invention depends more on the choice of classifier than on the choice of feature selection method.

Even with this high classification accuracy, the feature selection method and SVM classifier can be trained on modestly equipped machines, with relatively short training time, and very short classification time. All experiments and modeling construction and validation related to the present invention were performed on a LINUX® based desktop computer with dual 1 GHz PENTIUM III® processors, and 512 Megabyte memories.

Using this system, it took less than two hours to pre-process a total of 4,754 benign and malicious hexadecimal files, extract single byte patterns, and to calculate and normalize their frequencies. The training time varied from tens of seconds to train the SVM classifier, to 10 hours for the forward selection to screen all 256 single byte patterns. After an optimal model is constructed, the use of the model to classify the executable files took only an average of 2 seconds for each file in the dataset.

In summation, the present invention has the capability to automatically extract features from binary executables, to accurately and expeditiously distinguish between malicious files and benign files, and to provide another layer of computer and network security to prevent future malicious attacks. It accomplishes this at a high detection rate and a low false-positive rate. The invention provides a more sensitive and accurate method of detecting new viruses, which signature-based scanner cannot detect, and which heuristic scanners cannot do accurately.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of detecting malicious binary executable files comprising the steps of:
   inputting a binary executable file;
   converting said binary executable file to byte hexadecimal text strings;
   calculating the frequency of single byte patterns in said byte hexadecimal text strings;
   selecting characteristic single byte pattern frequencies as discriminating features;
   classifying said discriminating features as malicious or benign;
   labeling said binary executable file as malicious or benign;
   and outputting said labeled malicious or benign binary executable file.

2. The method as described in claim 1, wherein said step of selecting the characteristic single byte pattern frequencies is accomplished with a SVM classifier with 100 feature variables.

3. The method as described in claim 1, wherein said classifying step is accomplished with SVMs with radial basis function as the kernel.

4. The method as described in claim 3, wherein said SVMs with radial basis function as the kernel is a product-based classifier.

5. The method as described in claim 3, wherein said SVMs with radial basis function as the kernel is a Naive Bayes classifier.

6. The method as described in claim 3, wherein said SVMs with radial basis function as the kernel is an entropy classifier.

* * * * *